March 9, 1965
A. J. PAPPAS
3,172,212
CARPENTER'S LEVEL
Filed May 7, 1962
2 Sheets-Sheet 1
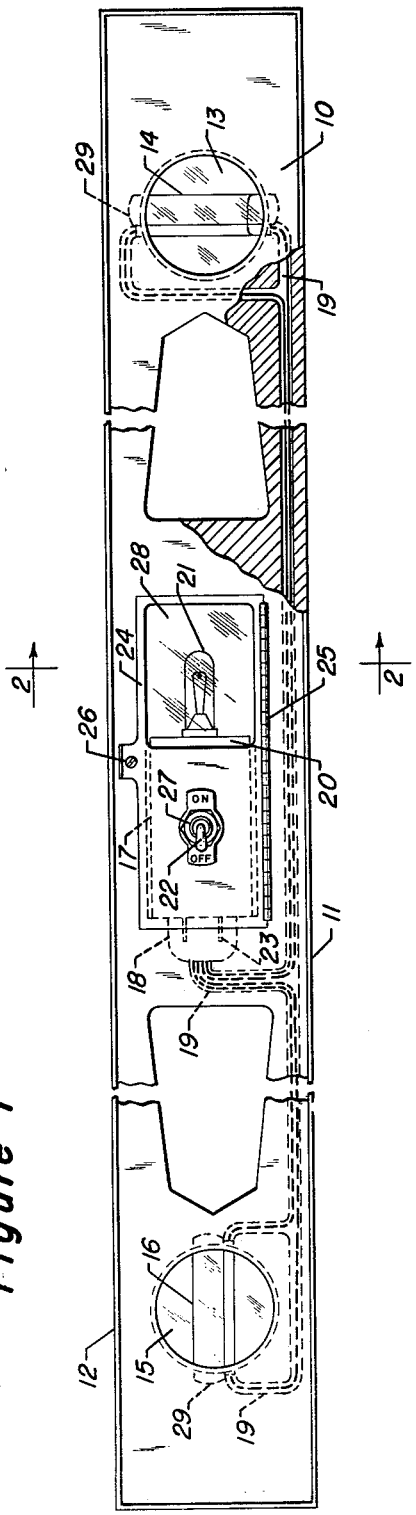
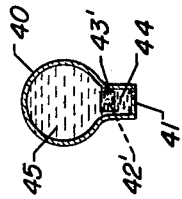
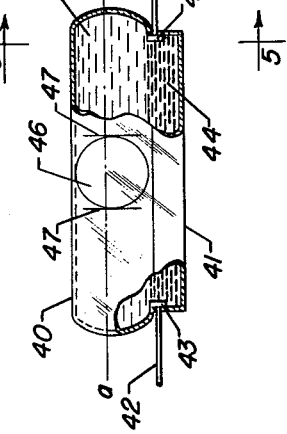
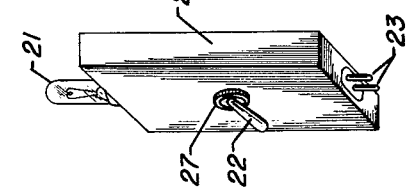
INVENTOR:
Anthony J. Pappas
BY:
James R. Hoatson Jr.
ATTORNEY March 9, 1965  A. J. PAPPAS  3,172,212
CARPENTER'S LEVEL
Filed May 7, 1962  2 Sheets-Sheet 2
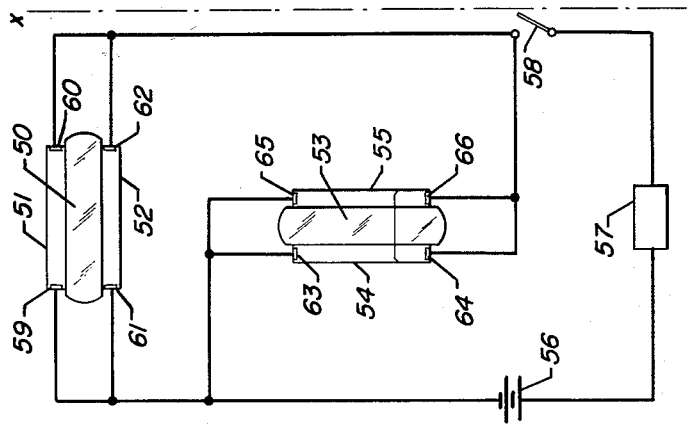
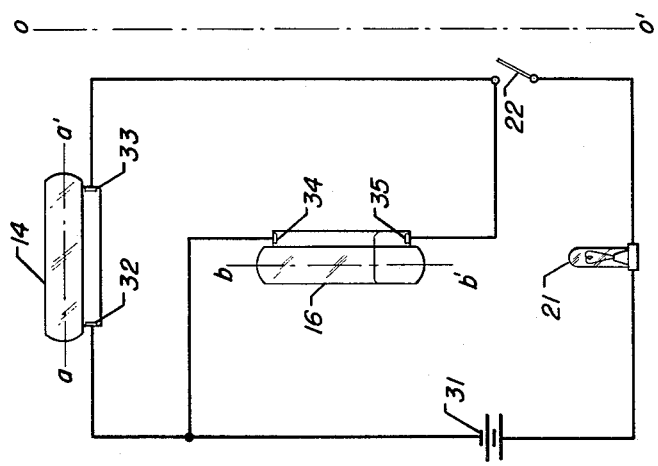
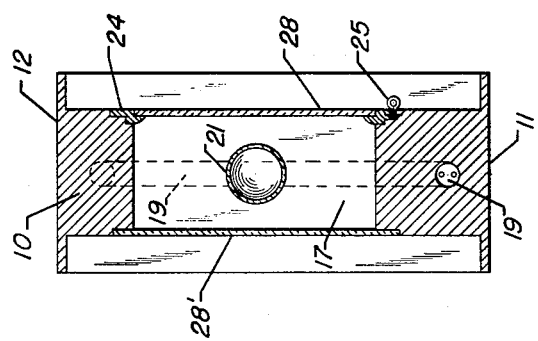
INVENTOR:
Anthony J. Pappas
BY:
James R. Hoatson Jr.
ATTORNEY

United States Patent Office 3,172,212
Patented Mar. 9, 1965

3,172,212
CARPENTER'S LEVEL
Anthony J. Pappas, Des Plaines, Ill., assignor of ten percent to Jesse W. Densch, Chicago, Ill.
Filed May 7, 1962, Ser. No. 192,726
17 Claims. (Cl. 33—206)

This invention relates to the art of manually operated angle-of-inclination detecting apparatus and more particularly to an improved level of the type employed by carpenters, cabinetmakers, masons, ironworkers and other craftsmen of the construction trades. The present invention is specifically directed to a level having associated therewith means for electrically generating an audio or visual signal whereby attainment of critical angularity of the level may be remotely observed by the operator.

The construction and use of conventional levels is well-known and only a brief description thereof need be given here. An elongated body or frame member, usually of rectangular-like shape and having a pair of parallel flat longitudinal seating edges, has mounted therein one or more bubble vials or glasses whose longitudinal axes (or central tangent lines in the case of curved glasses) are set at predetermined angles to the seating edges of the body. A typical general purpose level has at least two glasses, one a "plumb vial" whose longitudinal axis is perpendicular to the seating edges, and the other a "level vial" whose longitudinal axis is parallel to the seating edges. More elaborate levels may have three or more longitudinally spaced glasses, including a 45° vial, or two or three pairs of matched glasses which are calibrated with respect to both seating edges so that at least one glass is always in an operative position regardless of how the level is picked up. The glasses themselves may be adjustable or non-adjustable. In order to provide high sensitivity and good damping characteristics yet consistent with accuracy, the glasses are usually constructed of large radius arcuate tubing or of straight tubing the interior of which is ground barrel-shaped. In use, a longitudinal seating edge of the level is held flush against the working surface and if the latter has achieved the desired orientation, e.g., horizontal, vertical, 45°, etc., such position is indicated by the gas bubble of the appropriate glass being centered within a pair of transverse lines or markings in the center of the glass. In all events it is necessary that the user's eye be positioned directly adjacent and opposite to the glass in order to ascertain without parallax error the existence or non-existence of critical angularity, and herein lies the major disadvantage of prior art levels.

To the home hobbyist or other occasional user, the need for directly observing the bubble vial may seem a trifling matter, but every experienced tradesman who routinely employs a direct reading level in his daily professional work will appreciate the great inconvenience involved. Many situations are encountered on the jobsite wherein expert utilization of the level is an extremely time-consuming and repetitive process involving considerable physical exertion. These applications include those in which the tradesman is erecting a structural member which may itself be awkward to handle and which must be rigidly mounted at a predetermined angle. To cite one example, consider the erection of a doorframe wherein each jamb member must be perfectly plumb in two perpendicular planes. The carpenter first rotates the jamb member into the approximate vertical position and temporarily secures it by driving small wedges or shims between its upper end and the upper cross member. With one hand he then holds the level flat against one vertical surface of the jamb member while with the other hand he hammers its upper end into position. After one or more blows he must bend from the waist or stoop to gaze at the plumb vial of the level, note its reading, shift the level to the other vertical surface of the jamb and note this reading, estimate the magnitude of jamb movement still required, and then rise to administer what he hopes will be the correct number of hammer blows of the proper force and direction. Too often he has misjudged, the jamb is still not plumb or else he has overcorrected, and so the process of alternately hammering and bending to inspect the glass must be repeated, perhaps through several cycles until the jamb is vertical in both planes to the carpenter's satisfaction. The task is not yet complete, however, for in the course of nailing the jamb to the upper cross member and to the footing, he must again view the glass several times to make sure that vertical alignment is not thereby disturbed. The direct reading level of the prior art is also difficult to employ in poorly lighted work areas where the bubble cannot readily be seen. It is apparent that notwithstanding the inherent high accuracy and quality workmanship of the modern professional level, its application on the job frequently continues to be a source of vexation, wasted energy and lost time.

It is a principal object of the present invention to provide a signaling level which emits a signal in response to attainment of one or more predetermined spatial orientations by the level body, which signal is preferably audio or visual in nature and which is capable of being detected by the user at a distance of up to several feet, at least, from the level itself.

Another object of this invention is to provide a highly sensitive, electrically operated level which generates a sharp on-off signal with a minimum deadzone about each of its operative axes. A further object herein is the provision, in a level of the class described, of ruggedized electrical circuitry capable of sustained performance under abusive field conditions. These and other objects and advantages of the present invention will be made apparent and amplified in greater detail hereinbelow.

The essence of the generic invention is the provision of one or more attitude-responsive electric switching elements in association with the level body, either in lieu of or in addition to, the conventional bubble vials or glasses. The switching elements are electrically connected by appropriate circuit means to an electrical signaling device, such as a small lamp bulb or audio frequency buzzer, which signaling device may be mounted within or on the level body or carried by the operator externally thereof. The signaling means preferably operates from a self-contained battery power source but may, where desired, be connected to operate from a standard A.-C. power source if an outlet is convenient to the work area. The use of the apparatus is simple and straightforward. The operator is at once informed when his work piece is in the proper position without having to divert his attention from the immediate task of aligning and securing it.

The term "attitude-responsive electric switching element" is intended to connote a switching device having at least two stable states with its change-of-state being responsive to physical displacement or pitch from a reference or operative axis, most commonly a horizontal axis. It is especially desirable that the degree of deviation from the operative axis required to produce a change of state be as small as possible in order to provide the high sensitivity expected of a professional quality level. The switching element may be any one of numerous functionally equivalent devices. For example, it may take the form of a simple balanced beam switch which may be normally closed or normally open, the "normal" position being that where deviation from the operative axis exists. Alternatively, the switching element may be a mercury bottle switch having the form of a linear tube, arcuate tube or U-tube, with two or more poles and/or positions. Alternatively, the switching element may comprise a ferrous beam balanced on a knife edge with the ends of the beam proximately spaced from a pair of inductance coils which in turn are connected to an oscillator circuit; when the beam is in balance, the resulting equal inductances permit oscillation to occur whereby an audio signal may be generated or a relay activated. Alternatively, the switching element may comprise a free-rolling ferrous sphere disposed in a straight tube or on a track with an inductance pick-up coil located at the center of the track; the pick-up coil is operatively connected to a suitable oscillator circuit which is activated when the sphere reaches the center of the track. The associated circuitry will of course be designed, in a manner familiar to those skilled in the electronic arts, to energize the electric signaling means in accordance with activation of the attitude-responsive switching element and may comprise a mechanical relay or solid state elements such as diode gates or flip-flops the logic of which will be compatible with the action of the switching elements and the signaling means. The foregoing switching elements have been described with some particularity in order to indicate the wide variety thereof which may be employed in the instant level and which are deemed to be embraced within the broad scope of this invention.

With due regard for the very practical considerations of reliability, low cost and ability to withstand heavy abuse in the field, which are essential to any good hand tool, the preferred attitude-responsive switching element is an electrically conductive liquid-containing tubular switch of special design which will be described later in relation to the specific embodiments illustrated in the drawings.

The structure and arrangement of the present invention, together with various specific embodiments thereof, may best be described in conjunction with the accompanying drawings to which reference is now made. It should be understood that the drawings are presented for the purpose of illustrating the preferred construction of the instant level, but they are not intended to delimit the invention to any greater extent than is consistent with the spirit and scope of the appended claims.

FIGURE 1 of the drawings is a partially sectioned plan view of a completely assembled level of this invention.

FIGURE 2 is a sectional end view of the level taken along line 2—2 of FIGURE 1.

FIGURE 3 illustrates the signaling means detached from the level of FIGURE 1.

FIGURE 4 is a partially sectional plan view of one of the attitude-responsive switching elements employed in the level of FIGURE 1.

FIGURE 5 is a sectional end view of the switching element taken along line 5—5 of FIGURE 4.

FIGURE 6 is a schematic drawing of the switching elements, signaling means and interconnecting circuitry of the level of FIGURE 1.

FIGURE 7 is a schematic drawing of alternate circuitry employing modified switching elements and different signaling means.

With reference now to FIGURE 1, there is shown a portable elongated frame member or level body 10 having two parallel flat longitudinal edge portions 11 and 12 for seating the level against a work piece. Edges 11 and 12 may each be uniplanar, or partly planar, or may comprise two or more planar surfaces in the case of grooved seating edges commonly used in machinists' levels. Frame member 10 may be of the truss design, as illustrated, or of the full body design, and may be constructed of hardwood, aluminum, magnesium, iron or other suitable material. The specific level shown makes use of two attitude-responsive switching elements, in this case mercury-actuated tubular switches, one for obtaining a plumb reading and the other for obtaining a level reading. Mercury switch 14 is mounted in viewport 13 with its longitudinal axis perpendicular to seating edges 11 and 12; switch 14 closes when edge 11 is truly vertical and so provides a plumb reading. Mercury switch 16 is mounted in viewport 15 with its longitudinal axis parallel to seating edges 11 and 12; switch 16 closes when edge 11 is truly horizontal and so provides a level reading. In this particular embodiment, the positions or operative axes of switches 14 and 16 relative to edges 11 and 12 are non-adjustable; switches 14 and 16 are permanently set into mounting sockets 29, preferably with the aid of cement. Sockets 29 engage the ends of the tubular switches and maintain them in fixed calibrated positions relative to seating edges 11 and 12. A hollow compartment 17, formed in the central portion of frame member 10, contains the electrical signaling means.

The details of compartment 17 and its appurtenant hardware are more readily visible in the sectional view of FIGURE 2, which may be referred to at this time together with FIGURE 1. A two-pole female plug or receptacle 18 is mounted in frame member 10 at one end of compartment 17. A number of leadwire tunnels 19, formed within frame member 10, extend from the electrodes at the ends of mercury switches 14 and 16 to receptacle 18; the wiring necessary to provide electrical communication between the mercury switches and the signaling means is run through tunnels 19.

The signaling means itself is disposed in a removable instrument box or case 20, as illustrated in the perspective view of FIGURE 3. It includes a flashlight-type lamp bulb 21 protruding from one end of case 20, a two-pole male connector 23 at the other end of case 20, an on-off toggle switch 22, and a battery power source contained within case 20 but not visible in this view. With case 20 inserted into compartment 17 as shown in FIGURE 1, prongs 23 mate with receptacle 18 whereby lamp bulb 21 is rendered operative by either of mercury switches 14 and 16. This unitized construction is advantageous in that, if the lamp bulb burns out or the batteries become dead, the signal box may be quickly replaced in the field with a spare unit; the user is not obliged to carry on his person small replacement parts, such as bulbs or batteries which are easily lost. Furthermore, a sealed unitized construction provides a rugged apparatus capable of protecting the lamp, batteries and wiring from rain, snow and mud which are frequently encountered in outdoor work.

With reference again to FIGURES 1 and 2, compartment 17 is sealed by a door 24 which is secured to frame member 10 by means of hinge 25. Door 24 is held shut by a latch screw 26. Toggle switch 22 extends through a hole in door 24 of sufficient diameter to clear the toggle switch handle when the door is opened. A toggle switch locknut 27 firmly locks case 20 in position so that plug means 18 and 23 will not be inadvertently disengaged by rough handling. Case 20 can be removed from the compartment simply by removing latch screw 26 and locknut 27, opening door 24, and sliding case 20 free of receptacle 18. Door 24 is fitted with a window 28 constructed of glass or transparent plastic. A second window 28' is mounted on the opposite side of compartment 17. Windows 28 and 28' permit light rays from lamp 21 to be seen by the operator no matter what his position with respect to the level.

FIGURES 4 and 5 depict in greater detail the structure of a typical tubular mercury switching element such as switches 14 and 16 of FIGURE 1. This is a preferred form of attitude-responsive switching element, although many other types are also deemed suitable for the instant application, as has been previously pointed out. The mercury switch of FIGURES 4 and 5 comprises a sealed elongated upper tube 40 of relatively large volume; depending therefrom is a lower sealed longitudinal trough 41 of relatively small volume and being in open fluid communication with upper tube 40. The walls of tube and trough may be constructed of any suitable rigid nonconductor of electricity, either transparent or opaque; exemplary materials of construction, by no means exhaustive, include glass (as herein illustrated), quartz, molded nylon, phenolic resins, polyethylene, vinyl chloride and tetrafluoroethylene polymers, hard rubber, plastic-lined metal, and the like. Although not essential to the operability of the invention, a transparent tube is convenient in that it permits the switching element to function additionally as a direct reading bubble vial indicator. Longitudinally spaced metal electrodes 43 and 43′ are set into the end walls of trough 41; external electrical communication with the electrodes is provided by means of leadwires 42 and 42′. The vertical width of electrodes 43 and 43′ is preferably made as small as practicable and the electrodes are placed at the upper ends of the end walls close to upper tube 40 so that only a very slight inclination of the switch is necessary to open the circuit therethrough. Trough 41 is filled with a mobile pool of mercury 44 of just sufficient volume to contact simultaneously both electrodes 43 and 43′ when the longitudinal or operative axis $a$–$a'$ of the switch is perfectly horizontal. It is obvious that any other electrically conductive liquid may be substituted for mercury, e.g., aqueous solutions of inorganic salts, acids and bases such as KCl, NaCl, $Na_2SO_4$, HCl, $H_2SO_4$, NaOH, KOH, etc., and such other conductive media are considered to be embraced within the broad scope of this invention. Mercury, however, is preferred because it has high electrical conductivity and is not subject to electrolytic decomposition by D.-C. current. Axis $a$–$a'$, being parallel to a line connecting the centers of electrodes 43 and 43′, is the operative axis of the switch and when it is exactly horizontal, a circuit is completed by way of electrode 43—mercury pool 44—electrode 43′. If now the switch is rotated such that axis $a$–$a'$ is inclined toward the right, the mercury will spill over into the lefthand end of upper tube 40 and quickly break contact with electrode 43′; conversely, if the switch is rotated such that axis $a$–$a'$ is inclined toward the left, the mercury will spill over into the righthand end of upper tube 40 and quickly break contact with electrode 43. It will be seen that this design affords high sensitivity with a minimum dead zone with respect to bidirectional inclination of the switch to the horizontal axis.

An optional feature of the switch of FIGURES 4 and 5 is its concurrent use as a direct reading bubble vial. This is accomplished by filling the remaining volume of the switch with a light electrically nonconductive liquid, immiscible with and inert toward mercury, such as a middle distillate hydrocarbon oil, ethyl alcohol, isopropyl alcohol, etc., and injecting a nitrogen, neon or argon gas bubble therein. A light liquid phase of this type is indicated by numeral 45 which, together with gas bubble 46, occupies the internal volume of upper tube 40. Horizontalness of axis $a$–$a'$ is indicated when bubble 46 is centered within transverse markings 47.

The above-mentioned mercury-actuated tubular switch may be linear or arcuate, as desired, and may have a transverse cross-section other than circular; for example, its cross-section may be square, rectangular, polygonal or elliptical. Furthermore, the inside diameter of upper tube 40 may be made a trigonometric, parabolic, hyperbolic or other non-linear function of tube length. A modified form of tubular switch having a pair of diametrically opposed longitudinal troughs and four electrodes will be described below in connection with the circuit of FIGURE 7.

The circuit of the level of FIGURE 1 is given in the schematic diagram of FIGURE 6, to which reference may now be made. Vertical line $o$–$o'$ represents the plane of longitudinal edge 11. Mercury-actuated tubular switch 14, the plumb indicator, is mounted such that its operative axis $a$–$a'$ is maintained perpendicular to line $o$–$o'$; tubular switch 16, the level indicator, is mounted such that its operative axis $b$–$b'$ is maintained parallel to line $o$–$o'$. Electrodes 32 and 33 of switch 14 are connected in series with battery 31, lamp 21 and SPST on-off switch 22; electrodes 34 and 35 of switch 16 are connected in shunt with electrodes 32 and 33. Battery 31, lamp 21 and switch 22 are mounted within the plug-in instrument box 20 of FIGURES 1 and 3. With switch 22 closed and the level oriented so that electrodes 32 and 33 lie on a horizontal line below axis $a$–$a'$, as presently indicated, switch 14 completes a circuit through lamp 21, causing the latter to light and thus giving visual indication to the operator that the working surface is truly vertical. A very slight rotation of the level in the plane of the drawing, clockwise or counterclockwise, will cause switch 14 to open and de-energize lamp 21. The level can then be rotated clockwise from the position indicated in FIGURE 6 through an angle of about 90° without again energizing lamp 21. However, when the level is finally oriented so that electrodes 34 and 35 lie on a horizontal line below axis $b$–$b'$ (line $o$–$o'$ now being horizontal) switch 16 now completes a circuit through lamp 21, causing the latter to light and thus giving visual indication to the operator that the working surface is truly horizontal. Again, a very slight clockwise or counterclockwise rotation of the level from this latter orientation will suffice to open switch 16 and deenergize lamp 21. Although the lamp is turned on in response to attainment of either of two spatial orientations by the level—verticalness or horizontalness—the operator will obviously not be confused as to which of the two is controlling since he has direct manual supervision of the task. Even in the most awkward situation such as framing a door, the operator need only glance out of the corner of his eye to ascertain when the light is on, and he is not compelled to bend or stoop for a direct visual inspection of the switch itself.

The battery 31 may be any suitable electro-chemical power source, such as the conventional

$$Zn—NH_4Cl/ZnCl_2—C$$

cell, Zn—NaOH—CuO/Cu cell, mercury cell, AgCl cell, etc. One or more primary cells of the type used in penlights, flashlights, transistor radios or hearing aids may be advantageously employed. A secondary cell or storage battery may also be used. Since the preferred circuit is normally de-energized, a long battery life can be anticipated. It is also within the scope of this invention, however, to utilize an external power source instead of a self-contained portable power source, as by providing the level with a fixed or detachable extension cord adapted for connection with a standard 110 v. A.-C. outlet.

More than two attitude-responsive switching elements may be incorporated into the circuit of FIGURE 6. For example, a third switch whose operative axis is set at an angle of 45° to line $o$–$o'$ may be connected in parallel with switches 14 and 16 to furnish a 45° signal. Other switching elements may be used to provide signals at other commonly-encountered inclination angles such as 30° or 60°. An optional, more elaborate arrangement permits the electrical isolation of the several attitude-responsive switches, with manual selection of any one, by replacing the SPST switch 22 with a rotary selector switch having an appropriate number of positions equal to the number of attitude-responsive switches employed and preferably also including an "off" position.

The circuit of FIGURE 6 suffers one minor draw-back which is that the level is not immediately operative for all orientations thereof. For example, if a seating edge should be placed against the working surface in such a manner that electrodes 32 and 33 of switch 14 happen to lie above axis $a$–$a'$ (in the case of a plumb reading), or electrodes 34 and 35 of switch 16 happen to lie above axis $b-b'$ (in the case of a level reading), then the mercury pool of the particular switch involved will remain out of contact with the electrodes thereof even though the latter are horizontal, and the lamp will not light as expected. The operator should therefore take care that the level is properly oriented in the beginning. The circuit of FIGURE 7 is designed to eliminate this one inconvenience.

Turning now to FIGURE 7, the schematic diagram there illustrated utilizes a pair of mercury-actuated tubular switching elements similar to that of FIGURE 4 except that each switching element has two diametrically opposed longitudinal troughs and four electrodes, instead of the single trough with two electrodes. Vertical line $x-x'$ represents the plane of one of the seating edges of the level, the plane of the other edge being parallel thereto. Switch 50, the plumb indicator, has an upper longitudinal trough 51 provided with a first pair of spaced electrodes 59 and 60, and a lower longitudinal trough 52 provided with a second pair of spaced electrodes 61 and 62. Switch 50 is mounted in or on the level body such that both pairs of electrodes (59–60 and 61–62) lie on lines which are perpendicular to axis $x-x'$. Adjacent electrodes of each pair (59–61 and 60–62) are electrically connected by circuit means external to switch 50 and the resulting pair of shunted electrodes is connected in series with battery 56, buzzer 57 and on-off switch 58. Switch 53, the level indicator, has a lefthand longitudinal trough 54 provided with a first pair of spaced electrodes 63 and 64, and a righthand longitudinal trough 55 provided with a second pair of spaced electrodes 65 and 66. Switch 53 is mounted in or on the level body such that both pairs of electrodes (63–64 and 65–66) lie on lines which are parallel to axis $x-x'$. Adjacent electrodes of each pair (63–65 and 64–66) are electrically connected by circuit means external to switch 53 and the resulting pair of shunted electrodes is connected in parallel with those of switch 50. With switch 58 closed and the level oriented so that electrodes 61 and 62 lie on a horizontal line and trough 52 is below trough 51, as presently shown in FIGURE 7, switch 50 completes a circuit through buzzer 57 and gives an audible indication to the operator that the working surface is truly vertical. A very slight clockwise or counterclockwise rotation of the level in the plane of the drawing will cause switch 50 to open and deactivate buzzer 57. If it should happen that the level is initially picked up and held against the working surface in such fashion that trough 51 lies below trough 52—corresponding to a 180° rotation of the apparatus from the position of FIGURE 7—switch 50 is still operative to activate the buzzer in the manner aforesaid except that electrodes 59 and 60 are now active when they fall on a horizontal line. The level can be rotated clockwise or counterclockwise from the position indicated in FIGURE 7 through an angle of about 90° without again activating buzzer 57. However, when the level is finally oriented so that electrodes 63 and 64 lie on a horizontal line and trough 54 is below trough 55, or conversely so that electrodes 65 and 66 lie on a horizontal line and trough 55 is below trough 54 (line $x-x'$ now being horizontal in either case), switch 53 now completes a circuit through buzzer 57, either by way of electrodes 63 and 64 or by way of electrodes 65 and 66, and gives audible indication to the operator that the working surface is truly horizontal. To summarize the operation of the FIGURE 7 circuit, assuming a continuous clockwise rotation of the apparatus in the plane of the drawing and with line $x-x'$ initially as indicated therein, the buzzer will sound at 0° and 180° for verticalness and at 90° and 270° for horizontalness. Regardless of how the level is picked up or of which longitudinal seating edge thereof is applied to the working surface, the level is always immediately operative. It will be obvious that two opposed single-trough tubular switches may be substituted for each of the dual-trough switches to obtain the same result. It is also apparent that a lamp bulb may be substituted for the buzzer, that a greater number of dual-trough switching elements may be employed, that an external power source may be utilized instead of a self-contained battery, and that a multiposition rotary selector switch may be used to permit electrical isolation of the several attitude-responsive switching elements. Such modifications are principally a matter of choice to the designer and their use will be dictated by balanced considerations of cost, space limitations and user convenience.

Although the preferred signaling means of this invention is one which directly generates a signal naturally detectable by a human being without aid of a transducer, e.g., a lamp or buzzer, one possible modification is to employ a radio-frequency oscillator triggered by the attitude-responsive switching element. The operator then carries on his person a radio receiver which generates an audio signal or activates a light bulb in response to the RF signal.

By using three differently colored light bulbs and somewhat more elaborate circuitry including a relay or equivalent solid state logic, it is a simple matter to design the signaling means so that it will emit three distinguishable signals: "left tilt," "on center" and "right tilt." Information of this sort is usually of more practical benefit to the novice than to the expericenced craftsman.

Various other modifications of this invention will suggest themselves to those skilled in the art. For example, instead of having the attitude-responsive switches mounted in sockets within the level body, they may be attached to the sidewall thereof by means of suitable clamps or vialholders. Alternatively, the switches may be adjustably mounted in rotatable calibration rings as in the case of conventional adjustable glasses, with the electrical connections therewith being made through carbon brush-slip ring assemblies. Alternatively, the switches may be integrally installed on a frame or chassis designed to be attached to conventional levels, thereby providing a "clip-on" unit for converting existing levels at least cost. If desired, the signaling means may be separately carried on the person in a pack or carrying case, instead of being carried by the level itself; this would necessitate the use of an extension cable between the operator and the level.

Another important embodiment of this invention resides in the application of the generic principles hereinabove discussed to the telescope level and surveyor's level-transit. Such apparatus comprises a small telescope or sight glass rotatable about vertical and/or horizontal axes, the telescope being mounted above a flat plate or table which in turn is supported on a tripod; the table must be perfectly horizontal before accurate bearing and elevation readings can be taken with the instrument. To achieve this horizontalness, it has been customary to provide one or more bubble vials attached to the table, telescope, or supporting framework, with actual adjustment being made by means of leveling screws. In accordance with the present invention, such bubble vial may be replaced with one or more tubular mercury switches of the class described which activate an audio or visual electric signaling means either mounted on the level-transit itself or separately carried by the operator in an instrument pack or carrying case. It is preferred that at least two tubular mercury switching elements be arranged on the transit level table such that their operative axes are mutually perpendicular and both parallel to the plane of the table; they may be permanently or removably mounted directly on the table by means of brackets or vialholders, or may be integrally installed on a removable bedplate which can be bolted or clamped to the upper surface or under surface of the table. The signaling means may include a selector switch whereby the operator may independently select one or the other of the attitude-responsive switching elements which alone will activate the signaling means; alternatively, the switching elements may be connected in a series circuit so that the operative axes of both must be simultaneously horizontal before the signaling means is activated.

I claim as my invention:

1. A level comprising a portable frame member having at least one exterior planar surface and a compartment formed within the body thereof, an attitude-responsive electric switching element mounted in said frame member, means maintaining said switching element in a predetermined position relative to said planar surface, an instrument case removably disposed in said compartment, an electric signaling circuit contained in said case including a signaling device capable of generating a signal naturally detectable by a human being and an electrochemical power source thereof, mating male-female plug means connecting with said case and said compartment, and circuit means electrically connecting said switching element through said plug means to said signaling circuit.

2. A level comprising a portable elongated frame member having a pair of parallel flat longitudinal edges and a compartment formed within the body thereof; an attitude-responsive electric switching element mounted in said frame member, said switching element comprising a sealed elongated linear tube, a first pair of spaced electrodes at opposite ends of the tube adjacent the longitudinal wall thereof, a second pair of spaced electrodes at opposite ends of the tube but diametrically spaced from said first pair, and a mobile pool of electrically conductive liquid within the tube, said pool being of sufficient volume as to contact simultaneously both electrodes of only one of said pairs of electrodes when the tube is oriented such that the last-mentioned electrodes lie on a horizontal line; circuit means connecting adjacent electrodes of said first and second pairs; means maintaining said switching element in a predetermined position relative to said longitudinal edges; an instrument case removably disposed in said compartment; electric signaling means contained in said case including a signaling device capable of generating a signal naturally detectable by a human being and an electrochemical power source therefor; mating male-female plug means connecting with said case and said compartment; and circuit means electrically connecting said switching element through said plug means to said signaling means.

3. The apparatus of claim 2 further characterized in that the predetermined position of said switching element is such that said first pair of electrodes and said second pair of electrodes lie respectively on lines which are perpendicular to said longitudinal edges.

4. The apparatus of claim 2 further characterized in that the predetermined position of said switching element is such that said first pair of electrodes and said second pair of electrodes lie respectively on lines which are parallel to said longitudinal edges.

5. A level comprising a portable elongated frame member having at least one flat longitudinal edge and a compartment formed within the body thereof; an attitude-responsive electric switching element carried by said frame member; means maintaining said switching element in a predetermined position relative to said longitudinal edge; an instrument case removably disposed in said compartment; electric signaling means contained in said case including a signaling device capable of generating a signal naturally detectable by a human being and an electrochemical power source therefor; mating male-female plug means connecting with said case and said compartment; and circuit electrically connecting said switching element through said plug means to said signaling means.

6. The apparatus of claim 5 further characterized in that said signaling device is a lamp.

7. The apparatus of claim 5 further characterized in that said signaling device is a buzzer.

8. The apparatus of claim 5 further characterized in that said switching element comprises a sealed elongated tube, a pair of spaced electrodes at opposite ends of the tube, and a mobile pool of electrically conductive liquid within the tube which simultaneously contacts both electrodes only when the tube is oriented such that electrodes lie on a horizontal line.

9. The apparatus of claim 8 further characterized in that said electrically conductive liquid is mercury.

10. The apparatus of claim 8 further characterized in that the predetermined position of said switching element is such that the electrodes thereof lie on a line which is perpendicular to said longitudinal edge.

11. The apparatus of claim 8 further characterized in that the predetermined position of said switching element is such that the electrodes thereof lie on a line which is parallel to said longitudinal edge.

12. A level comprising a portable elongated frame member having at least one flat longitudinal edge and a compartment formed within the body thereof; a pair of attitude-responsive electric switching elements attached to said frame member; means maintaining said switching elements in predetemined and respectively different positions relative to said longitudinal edge; an instrument case removably disposed in said compartment; electric signaling means contained in said case including a signaling device capable of generating a signal naturally detectable by a human being and an electrochemical power source therefor; mating male-female plug means connecting with said case and said compartment; and circuit means electrically connecting said switching elements through said plug means to said signaling means.

13. The apparatus of claim 12 further characterized in that said signaling device is a lamp.

14. The apparatus of claim 12 further characterized in that said signaling device is a buzzer.

15. The apparatus of claim 12 further characterized in that each of said switching elements comprises a sealed elongated tube, a pair of spaced electrodes at opposite ends of the tube, and a mobile pool of electrically conductive liquid within the tube which simultaneously contacts both electrodes only when the tube is oriented such that the electrodes lie on a horizontal line.

16. The apparatus of claim 15 further characterized in that said electrically conductive liquid is mercury.

17. The apparatus of claim 15 further characterized in that the predetermined positions of said switching elements are such that the electrodes of one switching element lie on a line which is perpendicular to said longitudinal edge and the electrodes of the other switching element lie on a line which is parallel to said longitudinal edge.

References Cited by the Examiner
UNITED STATES PATENTS

| | | | |
|---|---|---|---|
| 1,251,349 | 12/17 | Day | 33—206 |
| 1,426,454 | 8/22 | Bredeson | 33—211 |
| 2,106,605 | 1/38 | Johnson et al. | |
| 2,433,585 | 12/47 | Warner | 33—206.5 X |
| 2,511,525 | 6/50 | Bradwell et al. | |
| 2,600,363 | 6/52 | Morris | 33—206.5 |
| 2,789,362 | 4/57 | Maroth | 33—206.5 |
| 2,893,134 | 7/59 | Shea | 33—206.5 |

ISAAC LISANN, *Primary Examiner.*